United States Patent [19]

Darling

[11] Patent Number: 4,655,376
[45] Date of Patent: Apr. 7, 1987

[54] TIE DOWN DEVICE AND METHOD

[76] Inventor: Gilbert R. Darling, Site 31, Box 86, Lantzville, British Columbia, Canada, V0R 2H0

[21] Appl. No.: 810,214

[22] Filed: Dec. 18, 1985

[51] Int. Cl.$^4$ .............................................. B60R 9/00
[52] U.S. Cl. .................................. 224/324; 248/503; 224/309
[58] Field of Search ............... 224/309, 322, 324, 273; 248/499, 503; 294/150; 24/68 R, 68 CD

[56] References Cited

U.S. PATENT DOCUMENTS

| | | | |
|---|---|---|---|
| 2,042,801 | 6/1936 | Pittman | 248/503 X |
| 3,143,264 | 8/1964 | Spero | 224/324 X |
| 4,326,655 | 4/1982 | Grader et al. | 224/322 X |
| 4,369,009 | 1/1983 | Fulford | 224/324 X |

FOREIGN PATENT DOCUMENTS

| | | | |
|---|---|---|---|
| 2482538 | 11/1981 | France | 224/322 |
| 907235 | 10/1962 | United Kingdom | 224/324 |

*Primary Examiner*—Stephen Marcus
*Assistant Examiner*—Robert M. Petrik

[57] ABSTRACT

One aspect of the invention provides a tie down device for securing an object carried on a rack. The device includes a braided rope having a length sufficient to loop the rope about the first end of the rack so two adjacent portions of the rope pass over the object and both ends of the rope are below the second end of the rack. There is an apparatus for securing the two ends of the rope below the second end of the rack and a telescopic twisting handle with two ends. The twisting handle is fitted between the adjacent portions of the rope and rotated end over end to twist the portions of the rope about each other to tighten the rope over the object. Also provided is a method for securing an object employing the device.

8 Claims, 6 Drawing Figures

4,655,376

TIE DOWN DEVICE AND METHOD

BACKGROUND OF THE INVENTION

Roof racks are commonly employed on automobiles for carrying objects. Typically they include a pair of elongated bars which may be secured to the roof of the automobile so the bars are spaced apart and extend transversely across the roof. Objects are placed on the racks and usually ropes are employed to tie the objects to the racks. It is known to be a time consuming and somewhat frustrating job to properly tie down the cargo so that it will not shift or become dislodged when the vehicle is in motion. This normally requires many knots in the rope which must be untied subsequently to remove the cargo. Stretchable members with hooks are sometimes used to secure the cargo, but these are not adequate for many heavy and large objects.

Accordingly, there is still a need for a simplified tie down device for securing an object carried on a rack of this nature. Earlier patents of interest include U.S. Pat. No. 1,566,235 to Sheehan which shows a tourniquet tightened by a twisting action and which utilises a handle element or twisting element. U.S. Pat. No. 614,177 to Welch shows a method of twisting rope or wire to produce tension. Of general interest are U.S. Pat. Nos. 3,128,516 to Halvarson and 210,527 to Harris.

SUMMARY OF THE INVENTION

The invention provides a tie down device for securing an object carried on a rack having a first end and a second end. The device includes a braided rope with a length sufficient to loop the rope about the first end of the rack so two adjacent portions of the rope pass over the object and both ends of the rope are below the second end of the rack. There is means for securing the two ends of the rope below the second end of the rack. A twisting handle with two ends is employed for fitting between the adjacent portions of the rope and twisting the portions of the rope about each other by end over end rotation of the twisting handle to tighten the rope over the object.

Preferably, the twisting handle has a hollow first part and a second part telescopically received in the first part. The second part is telescopically extendable from the first part to lengthen the twisting handle and stop untwisting of the portions of the rope when the twisting handle is released and at least one end of the twisting handle contacts the object.

The means for securing the two ends of the rope below the second end of the rack comprises a rope adjuster for tightening the untwisted rope, and a pair of pointed members adapted to penetrate the braided rope below the adjuster. The adjuster has two apertures for receiving the two ends of the rope. In a preferred form, the pointed members are pins.

DESCRIPTION OF THE PREFERRED EMBODIMENT

Figure 1:
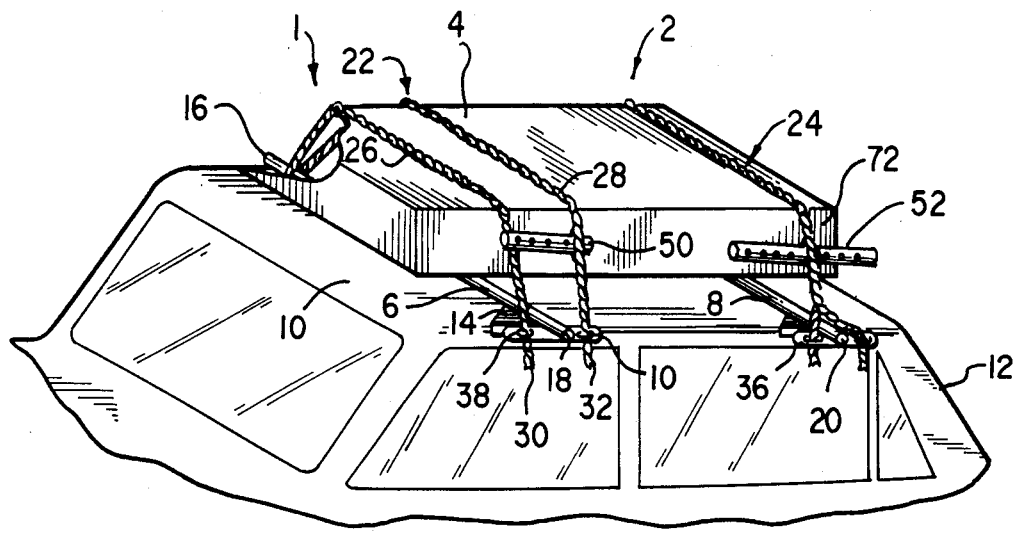
FIG. 1 is a perspective view of a pair of tie down devices according to the invention shown securing an object carried on a roof rack of an automobile, the object being partly broken away and the automobile being shown in fragment.

FIG. 1 shows a pair of tie down devices 1 and 2 used to secure an object 4 carried on a pair of roof racks 6 and 8 which are connected above roof 10 of an automobile 12. Racks 6 and 8 are conventional and therefore not shown in detail. They are typically connected to the rain gutters or outer edges of the roof by clamps at each end, for example clamp 14 of rack 6. Each rack has a first end, such as end 16 of rack 6, and a second end such as ends 18 and 20 of racks 6 and 8, respectively. Object 4 is represented by a box, but could be of any shape or size capable of being carried on racks 6 and 8.

The tie down devices 1 and 2 include braided ropes 22 and 24 respectively. Rope 22 is shown clearer because the rope is untwisted. The rope has a length sufficient to loop the rope about first end 16 of rack 6 so two adjacent portions or lengths 26 and 28 can pass over the object 4 and so both ends 30 and 32 of the rope are below the second end 18 of the rack.

Device 1 has a rope adjuster 34, while device 2 includes a similar adjuster 36. Rope adjuster 34 is shown in more detail in FIGS. 2 and 3. The adjuster 34 has a pair of apertures 38 and 40 for receiving the two ends 30 and 32 of the rope 22. As may be observed, the adjuster is in the shape of a bar, preferably of metal, and the apertures 38 and 40 are spaced apart.

Figure 2:
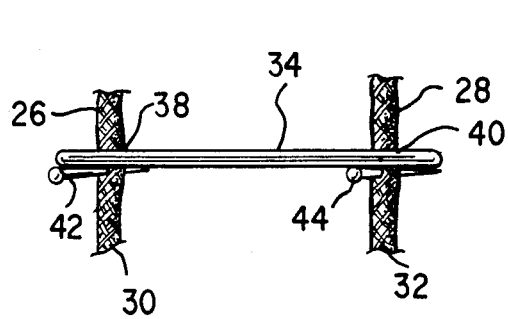
FIG. 2 is a fragmentary front elevation of one of the devices of FIG. 1 showing the ends of the rope, the adjuster and fids.
Figure 3:
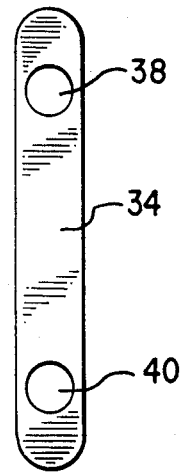
FIG. 3 is a top plan view of the adjuster of FIG. 2.
Figure 4:
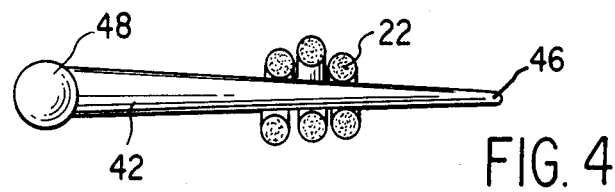
FIG. 4 is an elevation of one of the pins projecting through the rope shown in section.

Referring to FIG. 2, there is means for securing the ends of the rope below the second end of the rack including adjuster 34 and a a pair of pins 42 and 44 which are pins capable of piercing and passing through the rope near the ends. Pin 42 is shown in detail in FIG. 4. It has a sharp end 46 for passing through the rope and a ball 48 on the opposite end providing a convenient point for grasping or pushing the pin.

Figure 5:
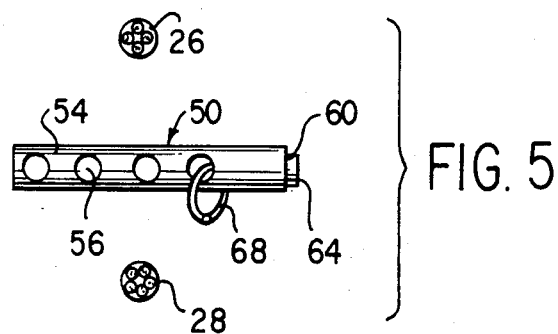
FIG. 5 is an elevation of one of the twisting handles of FIG. 1 between adjacent portions of the rope shown in section and untwisted, the twisting handle being telescopically shortened.
Figure 6:
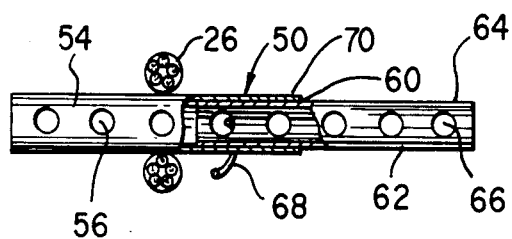
FIG. 6 is a view similar to FIG. 5 showing the ropes as twisted in section and the twisting handle lengthened telescopically.

Devices 1 and 2 also include telescopic twisting handles 50 and 52, the latter being shown in better detail in FIGS. 5 and 6. The twisting handle has a hollow first part 54 which is cylindrical in shape and has a plurality of apertures 56 spaced-apart along its length. Part 54 has a longitudinal central aperture 60. Twisting handle 50 also has a second part 64 telescopically receivable in the first part as shown in FIG. 5. FIG. 6 shows the second part telescopically extended from the first part. The second part is also a cylindrical tube with spaced-apart apertures 66. Outside 62 of second part 64 is slightly smaller in diameter than central aperture 60 of first part 54 so the second part is slidably received within the first part in a telescopic manner. Thus the first part and second part may be telescopically extended, as shown in FIG. 6, or retracted as seen in FIG. 5. A split ring 68 is provided to extend through adjacent apertures 56 and 66 of parts 54 and 64 to secure the two parts in the desired telescopic position.

The invention also relates to a method for securing the object 4 to racks 6 and 8 using the devices 1 and 2. Firstly, the ropes 22 and 24 are formed into loops. This is done by doubling the ropes as more easily appreciated for rope 22. The loop is completed by putting ends 30 and 32 of rope 22 through apertures 38 and 40 of rope adjuster 34 and then inserting pins 42 and 44 below the rope adjuster. The same is done for rope 24 using adjuster 36 and similar pins. The ropes are pulled relatively tight before the pins are inserted so that the rope adjuster in each case is adjacent the bottom of the rack.

At this point, one of the twisting handles is inserted between the two portions of one of the ropes passing over the object. For example, referring to FIG. 1, twisting handle 50 is inserted between portions 26 and 28 of rope 22 in the manner shown. It may be observed that, for this purpose, the second part of the twisting handle is telescopically received within the first part, as shown in FIG. 5 in more detail, to shorten the length of the twisting handle. The twisting handle is thus sufficiently short to permit the user to twist together the two portions 26 and 28 of rope 22 by end over end rotation of twisting handle 50.

Referring to rope 24 of FIG. 1, this shows the result of twisting the two portions of the rope 24 together by end over end rotation of twisting handle 52. The portions of the rope passing over the object are twisted together and appear as a single rope, although the two separate portions are still visible near rope adjuster 36. The ropes are twisted in this manner until each rope is tightened over the object 4. It is then necessary to prevent unintentional untwisting of each rope which would leave the object 4 unsecured. This is accomplished by pulling the two parts of the twisting handle apart to lengthen the twisting handle and achieve the position of FIG. 6. This may be observed for twisting handle 52 in FIG. 1. In this state, the twisting handle is too long to rotate end over end and allowing the untwisting. At least one end of the twisting handle, in this case end 72, contacts object 4 and cannot rotate further. This stops untwisting. A split ring is used to keep the handle in the extended position in the manner of split ring 68 used for handle 50 in FIGS. 5 and 6.

When the person wishes to remove object 4, the twisting handles are, in turn, shortened to the position of FIG. 5 and rotated in the opposite direction to untwist the ropes 22 and 24 to loosen the ropes over the object. The twisting handles and ropes are removed once the ropes are slack.

What is claimed is:

1. A tie down device for securing an object carried on a rack having a first end and a second end, the device comprising:
    a braided rope having a length sufficient to loop the rope about the first end of the rack so two adjacent portions of the rope pass over the object and both ends of the rope are below the second end of the rack;
    means for securing the two ends of the rope below the second end of the rack;
    twisting handle means having two ends for fitting between the adjacent portions of the rope and for twisting portions of the rope about each other by end over end rotation of the twisting handle means to tighten the rope over the object, wherein the twisting handle means has a hollow first part and a second part telescopically received in the first part, the second part being telescopically extendable from the first part to lengthen the twisting handle means and to stop untwisting of the portions of the rope when the twisting handle means is released and at least one end of the twisting handle means contacts the object.

2. A device as claimed in claim 1, wherein the two parts of the twisting handle have a plurality of longitudinally spaced-apart apertures, the device further comprising a split ring extendible through adjacent apertures of the two parts to keep the parts telescopically extended as desired.

3. A device as claimed in claim 1, wherein the means for securing the two ends of the rope below the second end of the rack comprises a rope adjuster and a pair of pins, the adjuster having two apertures for receiving the two ends of the rope, and the pair of pins being adapted to penetrate the braided rope below the adjuster.

4. A device as claimed in claim 3, wherein the adjuster is bar-like, the apertures being spaced-apart.

5. An apparatus for securing an object to a vehicle top, comprising:
    a pair of racks, each rack having first and second ends and having means to secure each said rack to the roof of the vehicle so the racks extend transversely across the roof in a parallel, spaced-apart relationship;
    a pair of braided ropes, each said rope having a length sufficient to loop said each rope about the first end of one of the racks so two adjacent portions of said each rope pass over the object and both ends of said each rope are below the second end of said each rack;
    means for securing the two ends of said each rope below the second end of said each rack; and
    a pair of twisting handle means, each having two ends, for fitting between the adjacent portions of the ropes and twisting the adjacent portions of said each rope about each other by end over end rotation of the twisting handle means to tighten the ropes over the objects, wherein said each twisting handle means has a hollow first part and a second part telescopically received in the first part, the second part being telescopically extendable from the first part to lengthen said each twisting handle means and to stop untwisting of the portions of said each rope when said each twisting handle means is released and at least one end of each said twisting handle means contacts the object.

6. An apparatus as claimed in claim 5, wherein the means for securing the two ends of said each rope below the second end of said each rack comprises a rope adjuster and a pair of pins, the adjuster having two apertures for receiving the two ends of said each rope, and the pair of pins being adapted to penetrate the rope below the adjuster.

7. An apparatus as claimed in claim 6, wherein the adjuster is bar-like, the apertures being spaced-apart.

8. A method for securing an object carried on a rack having a first end and a second end, the method comprising the steps of:
    forming a braided rope into a loop, extending the loop about the two ends of the rack and over the object so the rope has two adjacent portions over the object, inserting an elongated telescopic twisting handle between the portions of the rope and rotating the twisting handle end over end to twist the two portions of the rope together, thereby tightening the rope over the object, the twisting handle being telescopically shortened to rotate the twisting handle end over end, the twisting handle being telescopically lengthened after the rope is tightened and one end thereof being placed in contact with the object to prevent untwisting of the rope.

* * * * *